(12) United States Patent
Akashi et al.

(10) Patent No.: US 6,287,485 B1
(45) Date of Patent: Sep. 11, 2001

(54) VOLUME-MODULATION COLORATION PRODUCING MATERIAL, VOLUME-MODULATION COLORATION PRODUCING COMPOSITION, AND OPTICAL ELEMENT AND METHOD FOR OPTICAL MODULATION USING THE COMPOSITION

(75) Inventors: Ryojiro Akashi; Akinori Komura; Takashi Uematsu, all of Minami-Ashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/207,921

(22) Filed: Dec. 9, 1998

(30) Foreign Application Priority Data

Dec. 15, 1997 (JP) ..................................................... 9-345541
Oct. 16, 1998 (JP) ................................................... 10-295398

(51) Int. Cl.[7] ................. G02F 1/00; F21V 9/00; G02B 26/00
(52) U.S. Cl. .................. 252/583; 252/582; 252/586; 359/290; 359/296
(58) Field of Search .................................. 252/582, 583, 252/586; 359/290, 296

(56) References Cited

U.S. PATENT DOCUMENTS

| | | | | |
|---|---|---|---|---|
| 3,371,978 | * | 3/1968 | Matovich | 252/582 |
| 4,779,962 | * | 10/1988 | Nishimura et al. | 359/290 |
| 5,007,714 | * | 4/1991 | Nishimura | 359/296 |
| 5,665,275 | * | 9/1997 | Kobayashi et al. | 252/582 |
| 5,739,946 | * | 4/1998 | Iwanaga et al. | 359/290 |
| 5,961,891 | * | 10/1999 | Murasaki et al. | 252/582 |

FOREIGN PATENT DOCUMENTS

| | | |
|---|---|---|
| A-61-149926 | 7/1986 | (JP) . |
| A-61-151625 | 7/1986 | (JP) . |
| A-62-925 | 1/1987 | (JP) . |
| A-2-188294 | 7/1990 | (JP) . |
| A-4-274480 | 9/1992 | (JP) . |
| B2-7-65037 | 7/1995 | (JP) . |
| A-9-160081 | 6/1997 | (JP) . |

* cited by examiner

Primary Examiner—Philip Tucker
(74) Attorney, Agent, or Firm—Oliff & Berridge, PLC (57) ABSTRACT

A volume-modulation coloration producing material which is characterized by high contrast, high response and excellent durability; a composition including this material; an optical element and a method for optical modulation using the composition are disclosed. The volume-modulation coloration producing material includes a polymer gel capable of swelling-contracting by absorbing or desorbing a liquid when an external stimulus is given, and a pigment contained in the material at a concentration equal to or higher than a saturation absorption concentration. The volume-modulation coloration producing composition, which includes the volume-modulation coloration producing material and a liquid, exhibits a reversible volume change to swell or contract by the application of a stimulus such as, for example, heat, light, an electric current, an electric field, change in pH, change in ionic concentration, absorption or desorption of a substance and addition of a solvent. The pigment in the gel is in a diffused state (a) when the polymer gel is swollen while the pigment in the gel is in a flocculated state, (b) when the polymer gel is contracted so that the absorption efficiency of the light of the coloration producing material in a swollen state is higher than the absorption efficiency of the light of the coloration producing material in a contracted state.

20 Claims, 2 Drawing Sheets

VOLUME-MODULATION COLORATION PRODUCING MATERIAL, VOLUME-MODULATION COLORATION PRODUCING COMPOSITION, AND OPTICAL ELEMENT AND METHOD FOR OPTICAL MODULATION USING THE COMPOSITION

BACKGROUND OF THE INVENTION

1. Field of the Invention

The present invention relates a technique of a coloration producing material, especially relates to a coloration producing material capable of reversibly coloring-decoloring by an external stimulus, a composition containing the coloration producing material, and an optical element and a method for optical modulation using the composition. The coloration producing material of the present invention relates to a material which can be widely used as a functional material in such applications as the display of an image, a recording material, an optical element capable of controlling the amount of light transmission such as a light-adjusting element, a light-adjusting glass and so on, and a sensor.

2. Description of the Related Art

Traditionally, various coloration producing materials and the technologies therefor are known which are capable of reversibly presenting a color or a color density and which are designed for use in displays, recording, light adjustment, and sensors. Examples include an electrochromic material capable of reversibly coloring-decoloring using an electrical means, a photochromic material capable of reversibly coloring-decoloring using light, a thermochromic material capable of reversibly coloring-decoloring using heat, a material comprising a leuco dye combined with a color former and a color subtracter capable of reversibly coloring-decoloring the dye (Japanese Patent Application Laid-Open (JP-A) No. 2-188,294 and Japanese Patent Application Publication (JP-B) No. 7-65,037), a so-called guest-host liquid crystal comprising a dichroic dye and a liquid crystal and a display element using the liquid crystal, a method using the selective reflection of a cholesteric liquid crystal, and a method using the birefringence modulation of a liquid crystal (wavelength dispersion).

Also known is a technology wherein color display is performed by controlling the amount of light transmission or light scattering by using a polymer gel material (which is called a stimulus-responsive polymer gel) capable of reversibly causing a volume change (i.e., swelling and contraction) through a change in the pH, a change in the ionic strength, adsorption of material, addition of a solvent, heat, light, an electric current, or an electric field. For example, JP-A No. 61-149,926 proposes an optical element comprising a composition composed of a combination of a polymer gel capable of absorbing-desorbing a liquid by the action of an electric field and a colored liquid composed of a liquid and a pigment dispersed therein wherein the change in shape of the polymer gel causes the colored liquid to move so that the display is performed. JP-A No. 61-151,625 proposes an element using a colored polymer gel wherein the swelling of the polymer gel causes the optical density to decrease and the contraction of the polymer gel produces the coloration. JP-A No. 62-925 proposes an element wherein the display is performed by the change in light scattering of a polymer gel capable of absorbing-desorbing a liquid in compliance with a change in temperature. JP-A No. 4-274,480 proposes an element using a polymer gel having a dye linked thereto wherein the change in volume of the polymer gel causes the optical density to vary so that the display is performed.

Further, JP-A No. 9-160,081 proposes an element capable of changing the hue by the change in volume of a polymer gel by using the change in shape of a polymer gel adsorbed onto the surface of pigment fine particles or colored particles wherein a nearly white color is displayed when the polymer gel is swollen and the color of the pigment particles or colored particles is displayed when the polymer gel is contracted.

Problems associated with traditional coloration producing materials and technologies thereof are as follows. In the case of an electrochromic material, it is difficult to produce a full-color range; the durability is poor; and the coloration speed is slow. In the case of a photochromic material and a thermochromic material, it is difficult to produce a full-color range; the colored state cannot be maintained for a long period of time; and the durability is poor. In the case of a material comprising a leuco dye combined with a color former and a color subtracter capable of reversibly coloring-decoloring the dye, the stability at the time of coloration is poor; the durability is poor; and the color density is low, although this material is being studied as a reusable heat-sensitive recording paper.

In the case of a so-called guest-host liquid crystal comprising a dichroic dye and a liquid crystal and a display element using the liquid crystal, a method using the selective reflection of a cholesteric liquid crystal, and a method using the birefringence of a liquid crystal (wavelength dispersion), the contrast is low; the visual angle is narrow; and the element and the methods are expensive, although the element and the methods are being studied for use as a reflection display element.

Meanwhile, in the case of the technology wherein the display is performed by controlling the amount of light transmission or the light scattering by utilizing a stimulus-responsive polymer gel, for example, in the optical element comprising a composition composed of a combination of a polymer gel capable of absorbing-desorbing a liquid by the action of an electric field and a colored liquid, as described in JP-A No. 61-149,926, it is required that the colorant does not mingle in the polymer gel. In reality, however, this technology is not without the apprehension that the repeated use of the element causes the colored liquid to mingle in the polymer gel to thereby contaminate the polymer gel and decrease the contrast and is further associated with the problem that the response speed is slow because of the use of a relatively large polymer gel.

The element using a colored polymer gel wherein the swelling of the polymer gel causes the optical density to decrease and the contraction of the polymer gel produces the coloration, as described in JP-A No. 61-151,625, cannot provide a satisfactory contrast at the colorant concentration described in the present specification. In the case of the element wherein the display is performed by the change in light scattering of a polymer gel capable of absorbing-desorbing a liquid in compliance with the change in temperature, as described in JP-A No. 62-925, it is difficult to provide a display in color because of the use of light scattering and the contrast is low.

The element using a polymer gel having a dye linked thereto wherein the change in volume of the polymer gel causes the optical density to vary so that the display is performed, as described in JP-A No. 4-274,480, cannot provide a satisfactory contrast at the dye concentration described in the present specification and an attempt to increase the dye concentration so as to enhance the contrast is associated with the apprehension that the polymer gel may be structurally changed and the response characteristics may become poor. Another problem is that the durability such as light fastness is poor because of the use of the dye. The element utilizing the change in shape of a polymer gel as described in JP-A No. 9-160,081 presents the problems that the structure of the polymer gel is very complicated; the production of the polymer gel is very costly.

SUMMARY OF THE INVENTION

A first object of the present invention is to solve the problem of conventional coloration producing materials, conventional reversible coloration producing materials in particular, and to provide a volume-modulation coloration producing material which is based on a novel principle entirely different from that of conventional coloration producing materials and which is suited for the fabrication of an optical element characterized by high contrast, excellent durability, and excellent response.

A second object of the present invention is to provide a volume-modulation coloration producing composition using the volume-modulation coloration producing material having the above-mentioned characteristics.

A third object of the present invention is to provide an optical element using the volume-modulation coloration producing composition.

A fourth object of the present invention is to provide a method for optical modulation by means of the optical element.

The first object of the present invention can be achieved by a volume-modulation coloration producing material which is either a volume-modulation coloration material comprising a polymer gel capable of swelling-contracting by absorbing-desorbing a liquid when a stimulus is given and a pigment contained therein at a concentration equal to or higher than a saturation absorption concentration, or a volume-modulation coloration producing material comprising a polymer gel capable of swelling-contracting by absorbing-desorbing a liquid when a stimulus is given and a pigment contained therein, the volume modulation coloration producing material being characterized in that the light absorption efficiency in the swollen state of the coloration producing material is higher than the light absorption efficiency in the contracted state of the coloration producing material.

The second object of the present invention can be achieved either by a volume-modulation coloration producing composition composed of a volume-modulation coloration producing material comprising a polymer gel capable of swelling-contracting by absorbing-desorbing a liquid when a stimulus is given and a pigment contained therein at a concentration equal to or higher than a saturation absorption concentration and the liquid, or by a volume-modulation coloration producing composition composed of a volume-modulation coloration producing material comprising a polymer gel capable of swelling-contracting by absorbing-desorbing a liquid when a stimulus is given and a pigment contained therein, the volume modulation coloration producing material being characterized in that the light absorption efficiency in the swollen state of the coloration producing material is higher than the light absorption efficiency in the contracted state of the coloration producing material, and the liquid.

The third object of the present invention can be achieved either by an optical element having a cell comprising a pair of substrates maintaining therebetween a volume-modulation coloration producing material comprising a polymer gel capable of swelling-contracting by absorbing-desorbing a liquid when a stimulus is given and a pigment contained therein at a concentration equal to or higher than a saturation absorption concentration and the liquid, or by an optical element having a cell comprising a pair of substrates maintaining therebetween a volume-modulation coloration producing material comprising a polymer gel capable of swelling-contracting by absorbing-desorbing a liquid when a stimulus is given and a pigment contained therein, the volume modulation coloration producing material being characterized in that the light absorption efficiency in the swollen state of the coloration producing material is higher than the light absorption efficiency in the contracted state of the coloration producing material, and the liquid.

The fourth object of the present invention can be achieved either by a method for optical modulation comprising changing the optical density of a volume-modulation coloration producing composition, which comprises a volume-modulation coloration producing material comprising a polymer gel capable of swelling-contracting by absorbing-desorbing a liquid and a pigment contained therein at a concentration equal to or higher than a saturation absorption concentration and the liquid, by giving a stimulus to the volume-modulation coloration producing composition so as to swell or contract the coloration producing material, or by a method for optical modulation comprising changing the optical density of a volume-modulation coloration producing composition, which comprises a volume-modulation coloration producing material, composed of a polymer gel capable of swelling-contracting by absorbing-desorbing a liquid and a pigment contained therein, the volume modulation coloration producing material being characterized in that the light absorption efficiency in the swollen state of the coloration producing material is higher than the light absorption efficiency in the contracted state of the coloration producing material, and the liquid, by giving a stimulus to the volume-modulation coloration producing composition so as to swell or contract the coloration producing material.

DETAILED DESCRIPTION OF THE INVENTION

The basic structure of the volume-modulation coloration producing material of the present invention is composed of a coloration producing material comprising a polymer gel capable of changing volume (i.e., swelling and contracting) by an external stimulus and a pigment contained therein and a liquid.

When given an external stimulus, such as a change in pH, a change in ionic concentration, absorption-desorption of a chemical substance, a change in solution composition, application of light, application of heat, application of an electric field, or application of a magnetic field, the coloration producing material absorbs or releases a liquid so as to change the volume (i.e., swelling and contracting) and to change the area where the composition absorbs the light and to change the light absorptivity of the colorant to thereby change the light absorption efficiency and produce a coloration because the optical density changes. Preferably, the pigment contained in the coloration producing material is in a diffused state when the material is swollen and in a flocculated state when the material is contracted. Since the light absorbance of the pigment as a colorant contained in the material varies depending on the state, i.e., a diffused state or a flocculated state, the color density is caused to vary. It is particularly preferable that the light absorption efficiency of the coloration producing material in a swollen state be higher in comparison with the light absorption efficiency of the coloration producing material in a contracted state. This means that the light absorbance of the pigment as a colorant contained in the coloration producing material at the time when the material is swollen is greater than the light absorbance of the pigment as a colorant contained in the coloration producing material at the time when the material is contracted.

The above-mentioned characteristic is obtained by use of a polymer gel which exhibits a specific amount of change in volume in response to a stimulus, by setting the concentration of pigment in the coloration producing material to a specific concentration, or by selecting a specific kind of pigment.

Based on this principle, the coloration producing material of the present invention can produce a coloration ranging from a nearly colorless state over a wide density range. In addition, the coloration can be performed reversibly and also stepwise.

A metachromatic living being such as a chameleon or fish is known to have within the skin thereof pigment cells whose sizes vary in compliance with a neural stimulus so as to cause granular pigment (such as melanin) present in the cells to diffuse or flocculate to thereby change the color. The present invention comprises a novel method for coloration which artificially imitates the coloration principle of the above-described pigment cells and a material technology designed for the realization of the coloration.

Details of the material technology of the present invention are given below.

The stimulus-responsive polymer gel for use in the present invention is preferably a polymer gel capable of changing volume (i.e., swelling and contracting) by absorbing or desorbing a liquid in compliance with an external stimulus such as a change in pH, a change in the ionic concentration, absorption or desorption of a chemical substance, a change in solution composition, the application of light, the application of heat, the application of an electric field, or the application of a magnetic field. In addition, it is preferable that the stimulus-responsive gel be a gel which reversibly changes the volume.

Further details of the stimulus-responsive polymer gel are given below.

The polymer gel which responds to the stimulus of a change in pH caused by an electrode reaction or the like is preferably an electrolyte polymer gel. Examples of this type of polymer gel include cross-linked poly(meth)acrylic acid or metal salts thereof; cross-linked copolymers of (meth) acrylic acid with (meth)acrylamide, hydroxyethyl(meth) acrylate, an alkyl ester of (meth) acrylic acid or the like, or metal salts thereof; cross-linked copolymers of maleic acid with (meth)acrylamide, hydroxyethyl (meth)acrylate, an alkyl ester of (meth)acrylic acid or the like, or metal salts thereof; cross-linked polyvinylsulfonic acid or metal salts thereof; cross-linked copolymers of vinylsulfonic acid with (meth)acrylamide, hydroxyethyl(meth)acrylate, an alkyl ester of (meth)acrylic acid or the like, or metal salts thereof; cross-linked polyvinylbenzenesulfonic acid or metal salts thereof; cross-linked copolymers of vinylbenzenesulfonic acid with (meth)acrylamide, hydroxyethyl(meth)acrylate, an alkyl ester of (meth)acrylic acid or the like, or metal salts thereof; cross-linked polyacrylamidoalkylsulfonic acid or metal salts thereof; cross-linked copolymers of acrylamidoalkylsulfonic acid with (meth)acrylamide, hydroxyethyl (meth)acrylate, an alkyl ester of (meth)acrylic acid or the like, or metal salts thereof; cross-linked polydimethylaminopropyl (meth)acrylamide or quaternary salts thereof; cross-linked copolymers of dimethylaminopropyl(meth) acrylamide with (meth)acrylicacid, (meth)acrylamide, hydroxyethyl (meth)acrylate, an alkyl ester of (meth)acrylic acid or the like, metal salts thereof or quaternary salts thereof; cross-linked polymer blend of polydimethylaminopropyl(meth)acrylamide with polyvinyl alcohol or quaternary salts thereof; cross-linked polymer blend of polyvinyl alcohol with poly(meth)acrylic acid or metal salts thereof; cross-linked metal salts of carboxyalkyl cellulose; and partial hydrolysates of cross-linked poly (meth)acrylonitrile or metal salts thereof. More preferred examples include cross-linked metal salts of poly(meth) acrylic acid; cross-linked copolymers of metal salts of (meth)acrylic acid with (meth)acrylamide; cross-linked copolymers of maleic acid with (meth)acrylamide, hydroxyethyl (meth)acrylate, an alkyl ester of (meth)acrylic acid or the like, or metal salts thereof; and cross-linked polymer blend of polyvinyl alcohol with poly(meth)acrylic acid or metal salts thereof.

The polymer gel which responds to the stimulus given by an electric field to cause absorption-desorption of a chemical substance such as a surfactant or the like is preferably a strongly ionic polymer gel. Examples of this type of polymer gel include cross-linked polyvinylsulfonic acid; cross-linked copolymers of vinylsulfonic acid with (meth)acrylamide, hydroxyethyl(meth)acrylate, an alkyl ester of (meth) acrylic acid or the like; cross-linked polyvinylbenzenesulfonic acid; cross-linked copolymers of vinylbenzenesulfonic acid with (meth)acrylamide, hydroxyethyl(meth)acrylate, an alkyl ester of (meth)acrylic acid or the like; cross-linked poly (meth)acrylamidoalkylsulfonic acid; and cross-linked copolymers of (meth)acrylamidoalkylsulfonic acid with (meth)acrylamide, hydroxyethyl (meth)acrylate, an alkyl ester of (meth)acrylic acid or the like. More preferred examples include cross-linked polyvinylsulfonic acids, cross-linked polyvinylbenzenesulfonic acids, and cross-linked poly(meth)acrylamidoalkylsulfonic acids. The polymer gel is used in combination with a cationic surfactant such as a salt of alkylpyridine, e.g., n-dodecylpyridinium chloride, an alkylammonium salt, a phenylammonium salt, or a phosphonium salt, e.g., tetraphenylphosphonium chloride.

The substance which responds to the stimulus caused by electrically induced oxidation-reduction is preferably a CT complex (a charge transfer complex) made up of a cationic polymer gel and an electron accepting compound. Examples of the cationic polymer gel include cross-linked poly[N-alkyl-substituted aminoalkyl (meth)acrylamides] such as polydimethylaminopropylacrylamide; cross-linked poly[N-alkyl-substituted aminoalkyl poly(meth)acrylates] such as polydimethylaminoethyl acrylate, polydiethylaminoethyl acrylate or polydimethylaminopropyl acrylate, cross-linked polystyrene; cross-linked polyvinylpyridine; cross-linked polyvinylcarbazole; and cross-linked polydimethylaminostyrene. More preferred examples include a cross-linked product of poly[N-alkyl-substituted (meth)acrylamides]. These polymer gels are used in combination with an electron accepting compound such as benzoquinone, 7,7,8,8-tetracyanoquinodimethane (TCNQ), tetracyanoethylene, chloranil, trinitrobenzene, maleic anhydride, or iodine.

The substance which responds to the stimulus caused by heat is preferably a cross-linked polymer having LCST (lower critical solution temperature) and an IPN (interpenetrating polymer network) composed of two components linked to each other by hydrogen bonding. The former has a characteristic that it contracts at a high temperature, whereas the latter has a characteristic that it swells at a high temperature. Specific examples of the former include cross-linked poly[N-alkyl-substituted (meth) acrylamides] such as polyN-isopropylacrylamide, cross-linked copolymer of N-alkyl-substituted (meth)acrylamides and (meth)acrylic acid, metal salts thereof; cross-linked copolymers made up of two or more components such as (meth)acrylamides and alkyl (meth)acrylates; cross-linked polyvinyl methyl ether; and cross-linked alkyl-substituted cellulose derivatives such as methyl cellulose, ethyl cellulose and hydroxypropyl cellulose. Examples of the latter include an IPN made up of a cross-linked poly(meth) acrylamide and cross-linked poly(meth)acrylic acid and a partial neutralization product thereof (i.e., part of the acrylic aid units is converted into a metal salt); and an IPN made up of a cross-linked copolymer composed mainly of poly(meth) acrylamide and cross-linked poly(meth)acrylic acid and a partial neutralization product thereof. More preferable examples include an IPN made up of a cross-linked poly [N-alkyl-substituted alkylamide], cross-linked poly(meth) acrylamide and cross-linked poly(meth)acrylic acid; and a partial neutralization product thereof.

The substance which responds to the stimulus caused by light is preferably a cross-linked hydrophilic polymeric compound having a group, such as a triarylmethane derivative, a spirobenzopyran derivative, or the like, which undergoes ionic dissociation by the action of light. Examples of the substance include a cross-linked product of a copolymer made up of a vinyl-substituted triarylmethane leuco derivative and an acrylamide. More preferable is a cross-linked copolymer of a leuco derivative of a vinyl-substituted triarylmethane with acrylamide.

An example of the polymer gel, which responds by the change in solution composition or by the change in ionic strength and which is particularly preferred because of a large change obtainable in volume, is the electrolyte-based polymer gel.

Among the stimulus-responsive polymer gels enumerated, particularly preferred are polymer gels which respond (swell-contract) to the change in pH and which are exemplified by cross-linked metal salts of poly(meth)acrylic acid and cross-linked copolymers of metal salts of (meth) acrylic acid with (meth)acrylamide; polymer gels which respond to the absorption-desorption of a chemical substance such as a surfactant and which are exemplified by cross-linked poly(meth)acrylamidosulfonic acid; polymer gels which respond to oxidation-reduction and which are exemplified by cross-linked N-alkyl-substituted alkyl(meth) acrylamide; and polymer gels which respond to heat and which are exemplified by cross-linked poly[N-alkyl-substituted (meth)acrylamide], IPN compounds made up of cross-linked poly(meth)acrylamide and cross-linked poly (meth)acrylic aicd, and partial neutralization products thereof. By using these materials, it is possible to obtain a practical optical element such as a display element and a light adjusting element.

It is preferable that the amount of change in the volume of the stimulus-responsive polymer gel be large. The volume ratio of the volume at the swollen state to the volume at the contracted state is 5 or more, preferably 10 or more, and more preferably 20 or more. If the volume ratio is less than 5, the difference between swelling and contraction of the polymer gel is smaller. Accordingly, it becomes difficult to obtain a dispersed state of pigment and a flocculated state of pigment in compliance with the swelling and contraction of the polymer gel. As a result, the contrast as an optical element or the like becomes insufficient.

The pigment which is contained in the polymer gel particles is not particularly limited. An inorganic pigment, an organic pigment, and others can be used as the pigment. Preferred examples of the pigment include a color metal oxide, such as bronze powder, carbon black, anthraquinone pigments, azo pigments, phthalocyanine pigments, quinacridone pigments, perylene pigments, and indigo pigments. Pigments which have a high light absorption coefficient are particularly preferable. The particle diameters, which are expressed as average particle diameters of primary particles, of the pigments are preferably in the range of from 0.001 to 1 $\mu$m. Particularly preferable diameters are in the range of from 0.01 to 0.5 $\mu$m. This is because, if the diameters are 0.01 $\mu$m or less, release of the pigment from the polymer gel tends to occur, whereas, if the diameters are 0.5 $\mu$m or more, the coloration density may decrease.

Preferably, the pigment has in the molecule thereof a polar group, such as an acid group, a hydroxyl group, an amino group, a thiol group, a halide group, a nitro group, or a carbonyl group, so that a flocculated structure is easily formed within the polymer gel if the pigment concentration is high.

In the present invention, it is preferable that the pigment be contained in the polymer gel and the pigment be not released from the polymer gel. For the prevention of the release of the pigment, it is preferable to use a pigment whose particle diameter is greater than the mesh size of the polymer network of the polymer gel, to use a pigment whose interaction, such as electrical, ionic or other physical interaction, with the polymer gel is high, or to use a pigment whose surface is chemically modified. Examples of the pigment whose surface is chemically modified include a pigment to the surface of which a group capable of chemically bonding with the polymer gel such as an unsaturated group like a vinyl group, unpaired electrons and so on is introduced and a pigment to which a polymeric material is grafted.

The amount of the pigment to be contained in the polymer gel needs to be a concentration equal to or higher than the saturation absorption concentration. The term "a concentration equal to or higher than the saturation absorption concentration" as used herein means a concentration at which the average distance between pigment particles is ($\frac{1}{2}$)·$\lambda$ (formula (1) where $\lambda$ is the wavelength of light) or less, when the distance between pigment particles is measured in a state where the polymer gel is in a contracted state, i.e., a state where owing to an external stimulus the polymer gel absorbs almost no liquid (in other words, a state where the polymer gel is dry), in the case where a pigment which is generally used in the art and has a high absorption coefficient is used.

The formation of the state, in which the polymer gel contains the pigment particles in such a manner that the distance between the pigment particles is within the range specified above, makes it impossible for the light having a wavelength of $\lambda$ to penetrate between the pigment particles. Accordingly, if this state is formed, the light absorption by the pigment is performed not by individual pigment particles but by pigment particles collectively considered as one group. As a result, the light absorption efficiency changes.

The state in which the pigment particles exhibit a collective light-absorbing characteristic is referred to as a state where pigment is contained at a concentration equal to or higher than the saturation absorption concentration.

The term "a concentration equal to or higher than the saturation absorption concentration" is alternatively defined as a pigment concentration at which the relationship between the pigment concentration and the optical density (or the amount of light absorption), which is obtained in a specific optical path length, largely deviates from the relationship of a primary straight line.

Therefore, in order to produce a state where pigment is contained at a concentration equal to or higher than the saturation absorption concentration with respect to visual light, the distance between pigment particles is preferably 0.2 $\mu$m or less in the polymer gel in a dry state, because the wavelengths of the visual light range from 400 to 800 nm.

Meanwhile, if the specific gravity of the pigment particles is equal to the specific gravity of the polymer gel and further if the average particle diameter of the pigment particles is 0.1 $\mu$m or less, a pigment concentration of about 3% by weight or more in the polymer gel in a dry state is a standard desirable for attaining a concentration equal to or higher than the saturation absorption concentration.

However, the above-described concentration should be considered as a standard, and therefore this value varies depending on the particle diameters of the pigment and the light absorption coefficient of the pigment.

In order to attain the state of a concentration equal to or higher than the saturation absorption concentration, the pigment concentration in the coloration producing material is preferably in the range of from 5 to 95% by weight, and more preferably in the range of from 10 to 95% by weight, although the pigment concentration depends on the absorption coefficient of the pigment. If the pigment concentration is less than 5% by weight, a concentration equal to or higher than the saturation absorption concentration cannot be achieved and therefore the change in color density due to the volume change of the coloration producing material does not appear, or otherwise the coloration producing layer needs to be undesirably thick for obtaining a sufficient contrast. On the other hand, if the pigment concentration is more than 95% by weight, the swelling-contraction of the polymer gel does not well respond to a stimulus and therefore the stimulus-responsive characteristics and the amount of change in volume of the coloration producing material may become unsatisfactory.

Meanwhile, in the coloration producing material of the present invention, the polymer gel contains the pigment in such a manner that the light absorption efficiency in a swollen state of the coloration producing material is higher than the light absorption efficiency in a contracted state of the coloration producing material. Accordingly, the amount of the pigment to be incorporated in the polymer gel is selected depending on the difference between the light absorption efficiency in the state where the polymer gel is swollen by absorbing a liquid and the light absorption efficiency in the state where the polymer gel is contracted by releasing the liquid.

The coloration producing material made up of a polymer gel and a pigment contained therein can be prepared by a process comprising dispersing the pigment uniformly in a polymer prior to the cross-linking thereof and thereafter cross-linking the polymer or by a process comprising adding the pigment to the precursor monomer composition of a polymer at the polymerization stage thereof and then carrying out the polymerization. In the case where the pigment is added at the polymerization stage, it is also desirable to use a pigment having a polymerizable group or unpaired electrons (radical) so that a chemical bond is produced as stated previously.

It is desirable that the pigment be dispersed as uniformly as possible in the coloration producing material of the present invention. In particular, when the pigment is dispersed in a polymer, it is preferable to disperse the pigment uniformly by, for example, mechanical blending, mixing, or by using a dispersing agent.

When using the coloration producing material of the present invention, the state of the material is not particularly limited. Accordingly, the coloration producing material of the present invention may be in the state of particles, a block, a film, an amorphous substance, fibers, or others. Among these states, the material in the state of particles is particularly preferred because of advantages such as a better coloration, quick response, and wide range of application. The particulate state is not particularly limited, and therefore spherical, oval, polyhedral, porous, fibrous, star-like, acicular, cube, and vesicular states can be used in the present invention. In the case of particles, the average particle diameter is preferably in the range of from 0.01 $\mu$m to 5 mm, and more preferably in the range of from 0.01 $\mu$m to 1 mm. If the particle diameter is 0.01 $\mu$m or less, the problems are, for example, that the handling of the particles is difficult and that excellent optical characteristics cannot be obtained. On the other hand, if the particle diameter is more than 5 mm, the problem is, for example, that the response speed required to change volume is slowed remarkably.

The particles can be prepared by a generally adopted process, for example, a process comprising physically pulverizing the polymer gel, a process comprising chemically pulverizing a polymer prior to the cross-linking thereof and thereafter cross-linking the polymer to form a gel, or a particle-forming polymerization process such as emulsion polymerization, suspension polymerization, or dispersion polymerization.

In order to speed up the change in volume of the color producing material in response to a stimulus, it is also preferable to make the material porous as practiced in conventional polymer gel technology so that a liquid more easily penetrates or leaves the porous material. Generally, the porous polymer gel can be prepared by freeze-drying a swollen polymer gel containing a pigment.

The volume of the coloration producing material can be varied by giving a stimulus as previously described to the material in the presence of a liquid which the material can absorb.

The volume of the polymer gel can be significantly changed by changing the inner structure thereof through absorption or release of a liquid, for example, by the application of a radiation such as light or heat in the case of a heat-responsive polymer gel, by a change in the pH owing to an electrode reaction or otherwise by ionic adsorption or electrostatic action owing to an electric field in the case of an electricity-responsive polymer gel, or by the application of light in the case of a light-responsive polymer gel. The liquid which can be used for the above-described purpose is not particularly limited. Preferred examples of the liquid include water, an aqueous solution of an electrolyte, alcohol, ketone, dimethylformamide, dimethylacetamide, dimethylsulfoxide, acetonitrile, propylene carbonate, aliphatic solvents, aromatic solvents such as xylene, toluene, and a mixture thereof. The liquid maybe admixed with a surfactant which is absorbed into or desorbed from the polymer gel, an oxidizing-reducing agent such as a viologen derivative for promoting the change in pH of the solution, an acid, an alkali, a salt, a dispersion stabilizer, a stabilizer such as an antioxidant or ultraviolet absorber, or the like.

In order to exhibit the above-described characteristics, the coloration producing material of the present invention is preferably used as a composition comprising a combination thereof with a liquid. The liquid is preferably a liquid which the polymer gel can absorb as previously set forth. In order to prepare a preferable combination of the polymer gel containing a pigment and a liquid, the liquid which is used in the present invention is preferably a liquid which can dissolve the polymer (i.e., a polymer which is not cross-linked) constituting the gel (i.e., a liquid which has good affinity for the gel). For example, the liquid is preferably water, alcohol, a mixture of water and alcohol, an aqueous electrolyte, or the like for an ionic polymer gel, while the liquid is a nonaqueous organic solvent for the polymer gel which is a CT (charge transfer) complex made up of a cationic polymer gel and an electron-accepting compound because this gel is insoluble in water.

The mixing ratio of the coloration producing material to the liquid is preferably in the range of from 1:2000 to 1:1 by weight.

According to the coloration producing material of the present invention composed of a pigment and a stimulus-responsive polymer gel, the change in volume of the material causes the change of its area to absorb light and the pigment contained therein to diffuse-flocculate so as to change the light absorptivity to thereby change the light absorption efficiency of the material. As a result, the color density changes accordingly. In other words, it is possible to change the volume of the material by giving a stimulus to the material, that is, to vary the color density by a volume modulation. In this way, the present invention provides a novel coloration producing means. In addition, since the change in density can be performed reversibly or irreversibly, the coloration producing material of the present invention is a novel material which has been hitherto unknown. Examples of the stimulus to be added for producing the coloration include light, an electric field, a magnetic field, heat, a change in the pH, a change in the ionic concentration, the addition of a salt, a change in solution composition, and the absorption-desorption of a chemical substance.

Figure 1A:
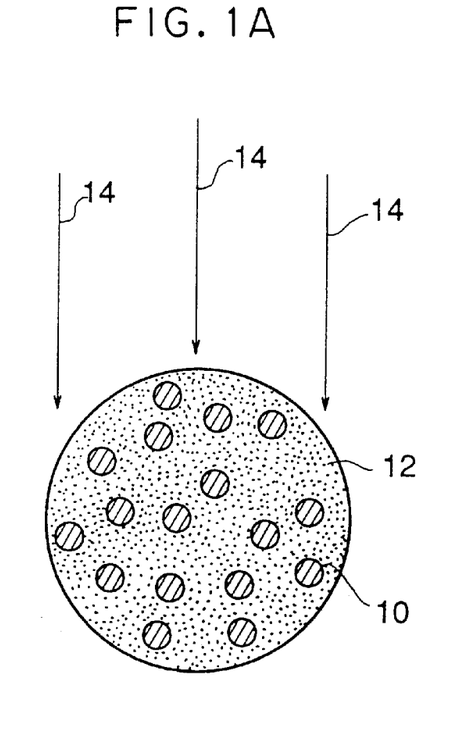
FIG. 1A and 1B illustrate the principle of the coloration of the coloration producing material of the present invention.
Figure 1B:
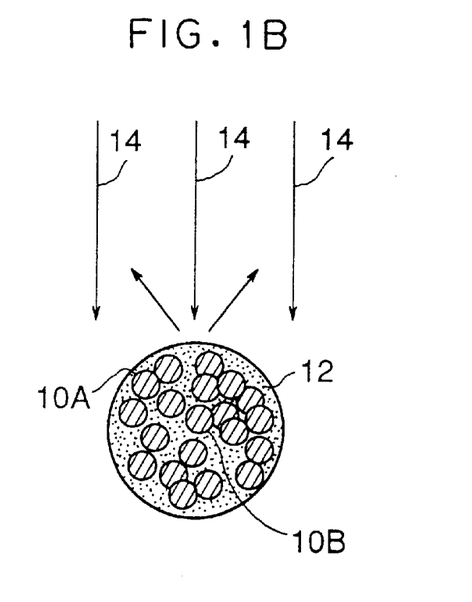

With reference now to FIGS. 1A and 1B, the principle of the coloration is explained.

FIG. 1A shows the swollen state of the coloration producing material of the present invention in a state composed of particles. In FIG. 1A, pigment particles 10 are preferably diffused/dispersed uniformly in the liquid-swollen substance 12 made up of the constituent polymer gel and liquid. The uniform dispersion allows the pigment 10 to efficiently absorb the light 14 and the light absorption efficiency of the coloration producing material increases. On the other hand, FIG. 1B shows a contracted state. In FIG. 1B, the pigment density of the pigment 10 increases owing to the volume contraction of the polymer gel and, as a result, the area to absorb light decreases, the light absorption decreases, and flocculation of the pigment is induced. Here, flocculation means a state where the distance between the pigment particles is half of the wavelength of light or less, as described previously. The flocculation produces a concentration equal to or higher than the saturation absorption concentration and causes the absorbed amount of the light 14 per unit amount of the pigment to decrease, thereby decreasing the light absorption efficiency of the coloration producing material. This phenomenon is believed to take place as follows. That is, if the flocculated body which is formed by the flocculation of the pigment exceeds a certain size, the pigment 10B present in the interior of the flocculated body does not participate in the light absorption, although the pigment 10A present on the surface of the flocculated body absorbs the light. As a result, the amount of light absorption per unit amount of the pigment decreases. Meanwhile, the contraction of a polymer gel is known to produce a nonuniform structure which increases the light scattering in comparison with the swollen state of the polymer gel. In particular, the light scattering on the surface of the polymer gel is believed to act to decrease the light absorptivity of the pigment and the purity of color. Consequently, it is believed that the combination of these actions causes the large difference between the swollen state and the contracted state of the polymer gel in the amount of light absorption, and, as a result, the density of color varies. Accordingly, the density of coloration can be controlled by the change in volume of the material comprising a polymer gel which contains a pigment. In addition, since the coloration producing material of the present invention can change the volume thereof stepwise, intermediate colors having various optical densities can be produced.

The volume-modulation coloration producing material of the present invention can be used as an optical element. The optical element is preferably composed of two substrates and the composition of the present invention maintained and sealed between the substrates. In the element having this structure, optical modulation can be performed by causing the coloration producing material to respond to a stimulus, such as light, heat, an electric field or a magnetic field, applied to the element.

The stimulus may be a natural stimulus or an artificial stimulus. If the stimulus is a natural stimulus, such as light or heat, the optical element by itself can be used as a light adjusting element of light adjusting glass or the like as well as a sensor. When an artificial stimulus is used, it is preferable to provide inside the element a means for imparting a stimulus such as heat (radiation), light (LED, laser or the like), an electrical stimulus, or a magnetic stimulus.

Figure 2:
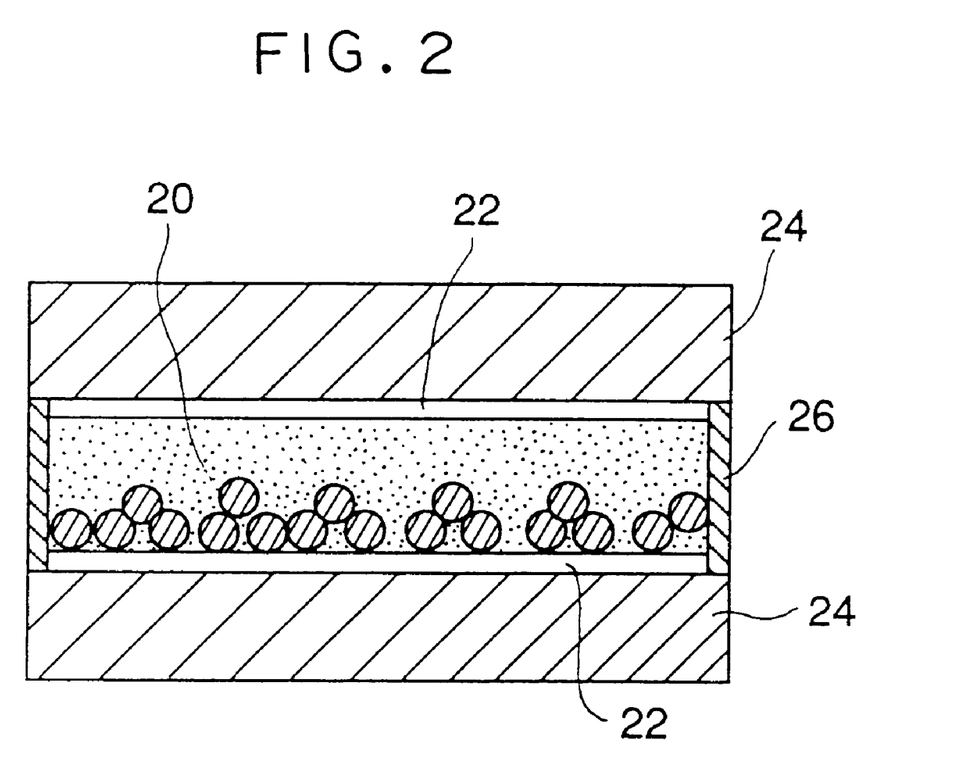
FIG. 2 is a schematic diagram illustrating a preferred embodiment of the optical element of the present invention.

FIG. 2 shows a preferred structure of an optical element. According to the optical element of FIG. 2, a volume-modulation coloration producing composition 20, which comprises a coloration producing material and a liquid, is maintained with the aid of spacers 26 between a pair of substrates 24 provided with stimulus-imparting means 22. FIG. 2 shows a state where a color is produced (i.e., a state where the polymer gel is swollen).

Examples of the material which can be used for forming the substrate 24 include films or planar substrates of such materials as polyester, polyimide, polymethyl methacrylate, polystyrene, polypropylene, polyethylene, nylon, polyvinyl chloride, polysulfone, polycarbonate and polyether, glass substrates, metals, and ceramics.

Meanwhile, an electrical means or a heat generating means is desirable as the stimulus-imparting means 22. Preferred examples of the electrical means include an electrode comprising a metallic film, an electrode comprising an electroconductive polymer, and an electrode comprising a polymer and metallic particles. Preferred examples of the heat generating means include combinations comprising the foregoing electrodes and heat generating resistors such as a metal represented by a Ni—Cr compound, a metal oxide, and carbon. Meanwhile, in the case where the optical element is used as a light adjusting element for light adjusting glass or the like, the stimulus-imparting means 22 does not need to be provided on the surface of the substrate, because the stimulus is an external stimulus such as the exterior temperature or light.

If the electrical means is provided, preferred examples of the composition include the polymer gel which responds to a change in pH, the polymer gel which responds to the absorption-desorption of a chemical substance such as a surfactant or the like, and the substance which responds to oxidation-reduction. If the heat generating means is provided, the heat-responsive polymer gel is preferably used. Further, if light is irradiated from outside, the light-responsive polymer gel is preferably used.

The thickness of the volume-modulation coloration producing composition 20 of the present invention which constitutes the optical element is preferably in the range of from 1 to 500 $\mu$m, and more preferably in the range of from 2 to 200 $\mu$m. If the thickness is less than 1 $\mu$m, a desired contrast cannot be obtained because the coloration density is low, whereas, if the thickness is more than 500 $\mu$m, response characteristics may become inferior.

The optical element may be composed of a coloration producing material for a single color or may be composed of coloration producing materials for a plurality of colors. If the coloration producing materials for a plurality of colors are used, a full-color formation or display can be performed by providing a plurality of segments, which each comprise a different combination of a polymer gel and a pigment and thus form a different color, on the plane of the optical element.

The optical element can be used as a light-adjusting element or filter for adjusting the amount of light transmission, and also as a display element for displaying an image. In the case of the polymer gel which responds to a change in solution composition, the polymer gel can be used in a detection method wherein the polymer gel is placed, for example, in a position for detecting a specific solvent so that the optical element is utilized as a sensor which optically detects the change in density of a color when the target liquid (chemical substance) is brought into contact with the polymer gel.

EXAMPLES

The following examples illustrate the present invention. They are not to be construed as limiting the scope of the present invention.

Example 1

Polymer gel particles containing a pigment were prepared according to the following method. 0.6 g of sodium hydroxide and 50 ml of distilled water were added to 5.0 g of a sodium salt of carboxymethyl cellulose (BS-H manufactured by Daiichi Kogyo Seiyaku Co., Ltd.) as a precursor of a polymer gel, and the mixture was stirred to prepare a viscous solution. 5.0 g of phthalocyanine blue pigment having an average particle diameter of primary particles of about 0.1 $\mu$m was added to the viscous solution, and the mixture was well stirred. 0.7 g of epichlorohydrin as a cross-linking agent was added to the mixture, which was then heated at 60° C. for 5 hours so that a gelification reaction was conducted. The colored polymer gel block thus prepared was pulverized by means of a homogenizer. Then, the resulting powder was put into a large amount of distilled water and filtered. By repeating this operation, the powder was purified. After this purification, the powder was dehydrated by using a large amount of methanol and dried. In this way, coarse particles of polymer gel were obtained.

The coarse particles of polymer gel were further pulverized to obtain fine particles. After the elimination of coarse particles, colored polymer gel particles, which had an average particle diameter of 10 $\mu$m in a dry state, were obtained.

The pure water absorption of the colored polymer gel particles was found to be about 200 g/g. Further, it was found that the colored particles obtained were caused to reversibly swell and contract by a change in the pH or by the addition of a salt or an organic solvent. The particle diameter of the particles in a swollen state was about 10 times the particle diameter of the particles in a contracted state. That is, the change in volume was about 64 times.

An aqueous dispersion containing the particles at a specific concentration (0.12 g/l) was prepared. The aqueous dispersion was placed in a cell for spectrophotometry which had an optical path length of 1 cm. The optical density of the particles, which were swollen by pure water (neutral), and the optical density of the particles, which were contracted by water acidified to a pH value of 3.0 by the addition of a small amount of an acid, were measured by light having a wavelength ($\lambda$) of 600 nm. The optical density in the swollen state was about 1.6 and the optical density in the contracted state was about 0.16 thus indicating a large change in the optical density. Since the concentration of the pigment was set to a constant value, it is believed that the change in volume of the colored polymer gel causes the diffusion and flocculation of the pigment, and, as a result, the light absorption efficiency changes, thereby changing the optical density. Further, it was found that, when the aqueous dispersion was brought back to a neutral state, the initial optical density was regained. In addition, the optical density could be changed stepwise within the range of from 0.16 to 1.6 by changing pH stepwise within the range of from 3.0 to 7.5.

The above results clarify that the coloration producing material of the present invention produces a coloration with a large change in optical density by the change in volume of the colored polymer gel and the color density can be reversibly changed.

Example 2

Polymer gel particles containing a pigment were prepared according to the following reversed phase suspension polymerization. To a mixture of 10 g of acrylic acid as a main monomer, 4 g of sodium hydroxide and 0.02 g of methylenebisacrylamide were added 20 g of distilled water, 0.1 g of ammonium persulfate and 10 g of phthalocyanine blue pigment as the same colorant as in Example 1. In this way, an aqueous liquid was prepared.

In a nitrogen-purged reactor was placed a solution comprising 200 ml of cyclohexanone and 1.0 g of a sorbitol-based surfactant (Solgen 50 manufactured by Daiichi Kogyo Seiyaku Co., Ltd.) dissolved therein, which was then added to the above-described aqueous liquid. The resulting aqueous liquid was then subjected to a high-speed agitation at 10,000 rpm by means of rotary blending blades for 10 minutes to thereby produce an emulsion.

After the emulsification, the temperature of the reaction system was adjusted to 25° C., and a 50% aqueous solution of tetramethylethylenediamine was added to the emulsion which was being stirred. In this way, a polymerization was conducted.

After the polymerization, the colored polymer gel particles thus produced were recovered and were then neutralized in an aqueous solution of sodium hydroxide. The colored polymer gel particles were washed with pure water repeatedly, and were then dried. The particles obtained had an average particle diameter of about 10 µm in a dry state.

The pure water absorption of the colored polymer gel particles was found to be about 250 g/g. Further, it was found that the colored particles obtained were caused to reversibly swell and contract by the change in pH or by the addition of a salt or an organic solvent. The particle diameter of the particles in a swollen state was about 5 times the particle diameter of the particles in a contracted state. That is, the change in volume was about 125 times.

An aqueous dispersion containing the particles at a specific concentration (0.12 g/l) was prepared. The aqueous dispersion was placed in a cell for spectrophotometry which had an optical path length of 1 cm. The optical density of the particles, which were swollen by pure water (neutral), and the optical density of the particles, which were contracted by water acidified to a pH value of 3.0 by the addition of a small amount of an acid, were measured by light having a wavelength ($\lambda$) of 600 nm. The optical density in the swollen state was about 1.6 and the optical density in the contracted state was about 0.1, thus indicating a large change in the optical density. Since the concentration of the pigment was set to a constant value, it is believed that the change in volume of the colored polymer gel causes the diffusion and flocculation of the pigment, and, as a result, the light absorption efficiency changes, thereby changing the optical density. Further, it was found that, when the aqueous dispersion was brought back to a neutral state, the initial optical density was regained. In addition, the optical density could be changed stepwise within the range of from 0.1 to 1.6 by changing pH stepwise within the range of from 3.0 to 7.5.

The above results clarify that the coloration producing material of the present invention produces a coloration with a large change in optical density by the change in volume of the colored polymer gel and the color density can be reversibly changed.

Example 3

Polymer gel particles containing a pigment were prepared according to the following reversed phase suspension polymerization. To a mixture of 10 g of N-isopropylacrylamide as a main monomer and 0.1 g of methylenebisacrylamide were added 20 g of distilled water, 0.1 g of ammonium persulfate and 8.0 g of a hydrophilic carbon black pigment having an average particle diameter of primary particles of about 0.1 µm (Cabojet 300 manufactured by Showa Cabot Co., Ltd.) as a colorant. In this way, an aqueous liquid was prepared.

In a nitrogen-purged reactor was placed a solution comprising 200 ml of cyclohexanone and 1.0 g of a sorbitol-based surfactant (Solgen 50 manufactured by Daiichi Kogyo Seiyaku Co., Ltd.) dissolved therein, which was then added to the above-described aqueous liquid. The resulting aqueous liquid was then subjected to a high-speed agitation at 10,000 rpm by means of rotary blending blades for 10 minutes to thereby produce an emulsion.

After the emulsification, the temperature of the reaction system was adjusted to 20° C., and a 50% aqueous solution of tetramethylethylenediamine was added to the emulsion which was being stirred. In this way, a polymerization was conducted.

After the polymerization, the colored polymer gel particles thus produced were recovered and were washed with pure water repeatedly, and were then dried. The particles obtained had an average particle diameter of about 15 µm.

The pure water absorption of the colored polymer gel particles was found to be about 38 g/g at 20° C. The colored particles obtained were found to contract by heating and to have a phase transition point at about 35° C. That is, the particles contracted at a temperature above the phase transition point but swelled at a temperature below the phase transition point. This change was found to be reversible. The particles exhibited about a 2.5 times size change by swelling and contraction. The ratio of the swollen volume to the contracted volume was found to be about 16.

An aqueous dispersion containing the particles at a specific concentration (0.15 g/l) was prepared. The aqueous dispersion was placed in a cell for spectrophotometry which had an optical path length of 1 cm. The optical density of the particles at 20° C. (swollen state) and the optical density of the particles at 50° C. (contracted state) were measured using light having a wavelength ($\lambda$) of 600 nm. The optical density in the swollen state was about 1.5 and the optical density in the contracted state was about 0.1, thus indicating a large change in the optical density. Since the concentration of the pigment was set to a constant value, it is believed that the change in volume of the colored polymer gel causes the diffusion and flocculation of the pigment, and, as a result, the light absorption efficiency changes, thereby changing the optical density. Further, it was found that the change in the optical density due to the change in temperature was reversible and no deterioration was found even after 100 repetitions of the change. In addition, it was confirmed that the optical density could be changed stepwise.

The above results clarify that the coloration producing material of the present invention produces a coloration with a large change in optical density by the change in volume of the colored polymer gel and the color density can be changed reversibly and in a stable manner.

Example 4

Heat-responsive (contractible by a high temperature) polymer gel particles which contained a pigment were prepared according to the following process.

To a mixture of 10 g of acrylamide and 0.2 g of methylenebisacrylamide as a cross-linking agent were added 50 g of distilled water, 10 g of a carbon black pigment as a colorant having a diameter of 0.1 µm of primary particles (SHOBLACK manufactured by Showa Cabot Co., Ltd.) and 0.01 g of Emulgen 909 (manufactured by Kao Corp.) as a dispersing agent for the carbon black. In this way, an aqueous liquid was prepared after the mixing of the components.

The aqueous liquid was placed in a flask, and the oxygen in the flask was eliminated by replacement with nitrogen. Then, 1.0 g of ammonium persulfate as a polymerization initiator was added to the contents, and the polymerization was conducted by heating the contents to 60° C. and keeping the contents at this temperature for 10 hours for the purpose of polymerization.

Upon completion of the polymerization, the product was roughly pulverized and the resulting powder was purified by washing with a large amount of distilled water. The powder was then dried to thereby obtain acrylamide gel containing the colorant.

Next, 10 g of the coarse acrylamide gel was placed in a flask, to which were added 50 g of acrylic acid, 0.1 g of methylenebisacrylamide as a cross-linking agent, 50 g of distilled water and 0.14 g of sodium hydroxide for partial (i.e., 5 mol % of the acrylic acid) neutralization of the acrylic acid. After purging the inside of the flask with nitrogen, 0.2 g of ammonium persulfate was added to the contents. Then, the contents were allowed to stand for 1 hour so that the acrylamide gel could swell by sufficient penetration thereinto of the acrylic acid-containing aqueous solution. After that, IPN polymer gel was prepared by heating the contents to 60° C. and keeping the contents at this temperature for 10 hours.

Upon completion of the polymerization, the IPN polymer gel block was pulverized by means of a homogenizer. Then, the resulting powder was put into a large amount of distilled water and filtered. By repeating this operation, the powder was purified. After this purification, the powder was dehydrated by using a large amount of methanol and dried. The diameter of the particles obtained in a dry state was about 20 $\mu$m.

The IPN particles were added to a large amount of pure water and the particles were swollen. At 10° C. when an equilibrium of swelling was attained, the amount of water absorption was about 3 g/g. When the swollen particles were heated to a temperature of 30° C., the particles swelled further and the amount of water absorption measured was about 150 g/g. The phase transition point was found to be in the range of from 15 to 20° C. That is, the particles swelled at a temperature above the phase transition point, whereas the particles contracted at a temperature below the phase transition point. This change was found to be reversible. The swelling-contraction caused about a 3.7-fold size change and about a 50-fold volume change of the particles.

An aqueous dispersion containing the particles at a specific concentration (0.20 g/l) was prepared. The aqueous dispersion was placed in a cell for spectrophotometry which had an optical path length of 1 cm. The optical density of the particles at 20° C. (contracted state) and the optical density at 50° C. (swollen state) were measured using light having a wavelength ($\lambda$) of 600 nm. The optical density in the swollen state was about 1.3 and the optical density in the contracted state was about 0.1, thus indicating a large change in optical density. Since the concentration of the colorant was set to a constant value, it is believed that change in volume of the colored polymer gel causes the diffusion and flocculation of the colorant, and, as a result, the light absorption efficiency changes, thereby changing the optical density. Further, it was found that the change in the optical density due to the change in temperature was reversible and no deterioration was found even after 100 repetitions of the change. In addition, it was confirmed that the optical density could be changed stepwise.

Example 5

An optical element, which performs a light adjusting function in compliance with a change in pH to be caused by an electrical means, was prepared according to the following process.

0.1 g of the colored polymer gel prepared in Example 2 was dispersed in 30 mg of an aqueous solution of sodium hydroxide ($1.0 \times 10^{-3}$ mol/l) to thereby prepare a composition. Then, the composition was injected into a cell prepared by stacking 2 sheets of glass which were fitted with ITO (indium-tin oxide) electrodes and kept apart by means of a 200 $\mu$m thick spacer. In this way, a sample was prepared. When the sample was prepared, the sample was in a state of approximately maximum swelling by absorbing about 200 g of the aqueous solution of sodium hydroxide per gram of the colored polymer gel and the color of the sample was dark black.

The sample was placed on an apparatus designed for the measurement of the amount of light transmission in a horizontal state so that one of the ITO glass sheets faced downward. Then, wiring to the sample was conducted. When a DC voltage of 3 V was applied to the lower ITO electrode serving as an anode, the sample became transparent almost instantly. According to the measurement of this change by means of an optical measuring apparatus comprising an optical microscope and a photo-diode fitted thereto for measuring the amount of light transmission, it was found that the amount of light transmission changed from about 15% to about 90%. When the electric current was stopped or when a voltage of a reverse polarity was applied, the sample turned black again. Therefore, the change in the amount of light transmission was found to be reversible. After more than 100 repetitions of the reversible changes, the sample showed no deterioration and was in a stable state. Further, it could be confirmed that the density gradation was obtained in compliance with the multiple changes of the amount of light transmission in the range of from about 15% to about 90% by controlling the length of the time period for the application of the voltage.

The results of the observation of the change in the amount of the light transmission, which was caused by the application of the voltage, reveal that the contraction-swelling of the particles of the colored polymer gel by the electrochemical reaction of the electrode causes the flocculation and diffusion of the pigment present inside the particles, and, as a result, the light absorption efficiency changes, thereby changing the amount of the light transmission.

It can be seen from the results that, since the sample exhibits a large change in the amount of the light transmission and the response is quick and since the change is repeated in a stable manner and provides a gradation in density, the sample can be used as an optical element whose amount of light transmission can be controlled.

Example 6

An optical element designed for light adjusting in compliance with the change of the outside temperature was prepared according to the following process.

0.5 g of the colored polymer gel prepared in Example 3 was dispersed in 30 g of distilled water so as to prepare a color producing composition comprising a swollen polymer gel.

Two sheets of 3 mm thick square soda lime glass having sides 20 cm long were used as substrates. A small amount of adhesive spacer particles having a diameter of about 40 $\mu$m was placed on one of the sheets and the spacer particles were fixed by heating. On the other sheet, the colored composition was coated to produce a layer having a thickness of about 50 $\mu$m by means of an applicator. After the formation of the layer, the layer was immediately put together with the substrate having the spacer formed thereon, and the two substrates were adhered to each other under a reduced pressure. The periphery was sealed with a sealant.

The light transmission (color density) of the sample varied depending on the outside temperature such that the color was black with almost no light transmission at a temperature of 20° C. or below but the sample was almost transparent at a temperature of 25° C. or above. Accordingly, the sample was capable of controlling the amount of light in compliance with the change of temperature in the course of a day when placed outdoors.

According to the measurement of this change by means of an optical measurement apparatus comprising an optical microscope and a photo-diode fitted thereto for measuring the amount of light transmission, it was found that the amount of transmission of white light changed from about 5% to about 80%. After more than 100 repetitions of the reversible changes, the sample showed no deterioration and was in a stable state.

Owing to the above results, it was found that the sample could be used as an optical element for such applications as light-adjusting glass and privacy glass.

Comparative Example

Polymer gel particles containing a pigment were prepared by repeating the procedure of Example 1, except that the amount of the pigment added was 0.1 g (corresponding to 2.0% with respect to the sodium salt of carboxymethyl cellulose). In this way, particles of polymer gel, which had an average particle diameter of 10 $\mu$m in a dry state, were obtained. The pure water absorption of the colored polymer gel particles was found to be about 300 g/g. Further, it was found that the colored particles obtained were caused to reversibly swell and contract by the change in pH or by the addition of a salt or an organic solvent. The particle diameter of the particles in swollen state was about 5 times the particle diameter of the particles in contracted state. That is, the change in volume was about 125 times.

An aqueous dispersion containing the particles at a specific concentration (2.0 g/l) was prepared. The aqueous dispersion was placed in a cell for spectrophotometry which had an optical path length of 1 cm. The optical density of the particles which were swollen by pure water (neutral) and the optical density of the particles which were contracted by water acidified to a pH value of 3.0 by the addition of a small amount of an acid were measured using light having a wavelength ($\lambda$) of 600 nm. The optical density in the swollen state was about 1.6 and the optical density in the contracted state was also about 1.6, thus indicating entirely no change in the optical density. This is presumably because the concentration of the pigment in the colored polymer gel was so low that the concentration did not exceed the saturation absorption density even when the polymer gel contracted.

It can be seen from this result that the effect of the present invention is not exhibited unless the amount of the pigment exceeds the saturation absorption density.

As stated above, the present invention provides an optical element and a method for light modulation which are based on a novel principle entirely different from traditional principles and which are characterized by high contrast, excellent durability, and excellent response. Further, the present invention provides a volume-modulation coloration producing material which can constitute the optical element and the method for light modulation as well as a volume-modulation coloration producing composition using the material.

What is claimed is:

1. A volume-modulation coloration producing material, comprising:
    a polymer gel capable of (a) swelling by absorbing a liquid and (b) contracting by desorbing the liquid, when a stimulus is given; and
    a pigment having a concentration equal to or greater than the saturation absorption concentration, the saturation absorption concentration is the concentration at which an average distance between pigment particles is $\leq \frac{1}{2} \lambda$ (where $\lambda$ is the wavelength of light) when a distance between the pigment particles is measured in a state in which the polymer gel is in a contracted state when the stimulus is given.

2. A volume-modulation coloration producing material according to claim 1, wherein the coloration producing material comprises either (a) a colored polymer gel prepared by a process comprising dispersing the pigment uniformly in a polymer prior to cross-linking thereof and then cross-linking the polymer, or (b) a colored polymer gel prepared by a process comprising adding the pigment to a precursor.

3. The volume-modulation coloration producing material according to claim 1, wherein the pigment concentration in the coloration producing material is in the range of from 5 to 95% by weight.

4. The volume-modulation coloration producing material according to claim 1, wherein the coloration producing material comprises particles having an average particle diameter that ranges from 0.01 $\mu$m to 5 mm.

5. A volume-modulation coloration producing material, comprising:
    a polymer gel capable of (a) swelling by absorbing a liquid, and (b) contracting by desorbing the liquid, when a stimulus is given; and
    a pigment having a concentration equal to or greater than the saturation absorption concentration, the saturation absorption concentration is the concentration at which an average distance between pigment particles is $\leq \frac{1}{2} \lambda$ (where $\lambda$ is the wavelength of light) when a distance between the pigment particles is measured in a state in which the polymer gel is in a contracted state when the stimulus is given;
    wherein the volume-modulation coloration producing material being characterized in that the light absorption efficiency in the swollen state of the coloration producing material is higher than the light absorption efficiency in the contracted state of the coloration producing material.

6. The volume-modulation coloration producing material according to claim 5, wherein the coloration producing material comprises either (a) a colored polymer gel prepared by a process comprising dispersing the pigment uniformly in a polymer prior to cross-linking thereof and the cross-linking the polymer, or (b) a colored polymer gel prepared by a process comprising adding the pigment to a precursor monomer of a polymer and then carrying out the polymerization.

7. The volume-modulation coloration producing material according to claim 5, wherein the pigment concentration in the coloration producing material is in the range of from 5 to 95% by weight.

8. The volume-modulation coloration producing material according to claim 5, wherein the coloration producing material comprises particles having an average particle diameter that ranges from 0.01 $\mu$m to 5 mm.

9. A volume-modulation coloration producing composition composed of a volume-modulation coloration producing material, the volume-modulation coloration producing material comprising:
    a liquid;
    a polymer gel capable of (a) swelling by absorbing the liquid, and (b) contracting by desorbing the liquid, when a stimulus is given; and
    a pigment having a concentration equal to or higher than the saturation absorption concentration, the saturation absorption concentration is the concentration at which an average distance between pigment particles is $\leq \frac{1}{2}\lambda$ (where $\lambda$ is the wavelength of light) when a distance between the pigment particles is measured in a state in which the polymer gel is in a contracted state when the stimulus is given.

10. The volume-modulation coloration producing composition according to claim 9, wherein a ratio of the volume of the coloration producing material in the swollen state to the volume of the coloration producing material in the contracted state is at least 10.

11. A volume-modulation coloration producing composition composed of a volume-modulation coloration producing material, the volume-modulation coloration producing material comprising:
   a liquid;
   a polymer gel capable of (a) swelling by absorbing the liquid, and (b) contracting by desorbing the liquid, when a stimulus is given; and
   a pigment having a concentration equal to or greater than the saturation absorption concentration, the saturation absorption concentration is the concentration at which an average distance between pigment particles is $\leq \frac{1}{2} \lambda$ (where $\lambda$ is the wavelength of light) when a distance between the pigment particles is measured in a state in which the polymer gel is in a contracted state when the stimulus is given,
   said volume-modulation coloration producing material being characterized as having a light absorption efficiency in the swollen state of the coloration producing material that is higher than the light absorption efficiency in the contracted state of the coloration producing material.

12. A volume-modulation coloration producing composition according to claim 11, wherein a ratio of the volume of the coloration producing material in the swollen state to the volume of the coloration producing material in the contracted state is at least 10 or more.

13. An optical element comprising:
   a cell including:
      a pair of substrates; and
      a volume-modulation coloration producing material according to claim 1 between the pair of substrates.

14. The optical element according to claim 13, further comprising means for giving the stimulus to the cell.

15. The optical element according to claim 13, wherein the optical density of the cell in the swollen state is higher than the optical density of the cell in the contracted state.

16. An optical element comprising:
   a cell including:
      a pair of substrates; and
      a volume-modulation coloration producing material according to claim 5 between the pair of substrates.

17. The optical element according to claim 16, further comprising means for giving the stimulus to the cell.

18. A method for optical modulation, comprising changing the optical density of a volume-modulation coloration producing composition, which comprises a liquid and a volume-modulation coloration producing material comprising a polymer gel capable of (a) swelling by absorbing the liquid, and (b) contracting by desorbing the liquid, and a pigment contained therein at a concentration equal to or higher than the saturation absorption concentration, by giving a stimulus to the volume-modulation coloration producing composition so as to swell or contract the coloration producing material, the saturation absorption concentration is the concentration at which an average distance between pigment particles is $\leq \frac{1}{2} \lambda$ (where $\lambda$ is the wavelength of light) when a distance between the pigment particles is measured in a state in which the polymer gel is in a contracted state when the stimulus is given.

19. A method for optical modulation, comprising changing the optical density of a volume-modulation coloration producing composition, which comprises a volume-modulation coloration producing material, composed of a liquid and a polymer gel capable of (a) swelling by absorbing the liquid, and (b) contracting by desorbing the liquid, and a pigment having a concentration equal to or greater than the saturation absorption concentration, the saturation absorption concentration is the concentration at which an average distance between pigment particles is $\leq \frac{1}{2} \lambda$ (where $\lambda$ is the wavelength of light) when a distance between the pigment particles is measured in a state in which the polymer gel is in a contracted state when a stimulus is given, said volume modulation coloration producing material being characterized as having a light absorption efficiency in the swollen state of the coloration producing material that is higher than the light absorption efficiency in the contracted state of the coloration producing material, by giving the stimulus to the volume-modulation coloration producing composition so as to swell or contract the coloration producing material.

20. The method for optical modulation according to claim 19, wherein the optical density in the swollen state produced by providing the stimulus is higher than the optical density in the contracted state.

* * * * *